April 17, 1945.　　　A. BELCHETZ　　　2,374,073
CATALYTIC CONVERSION OF HYDROCARBONS
Original Filed May 20, 1939
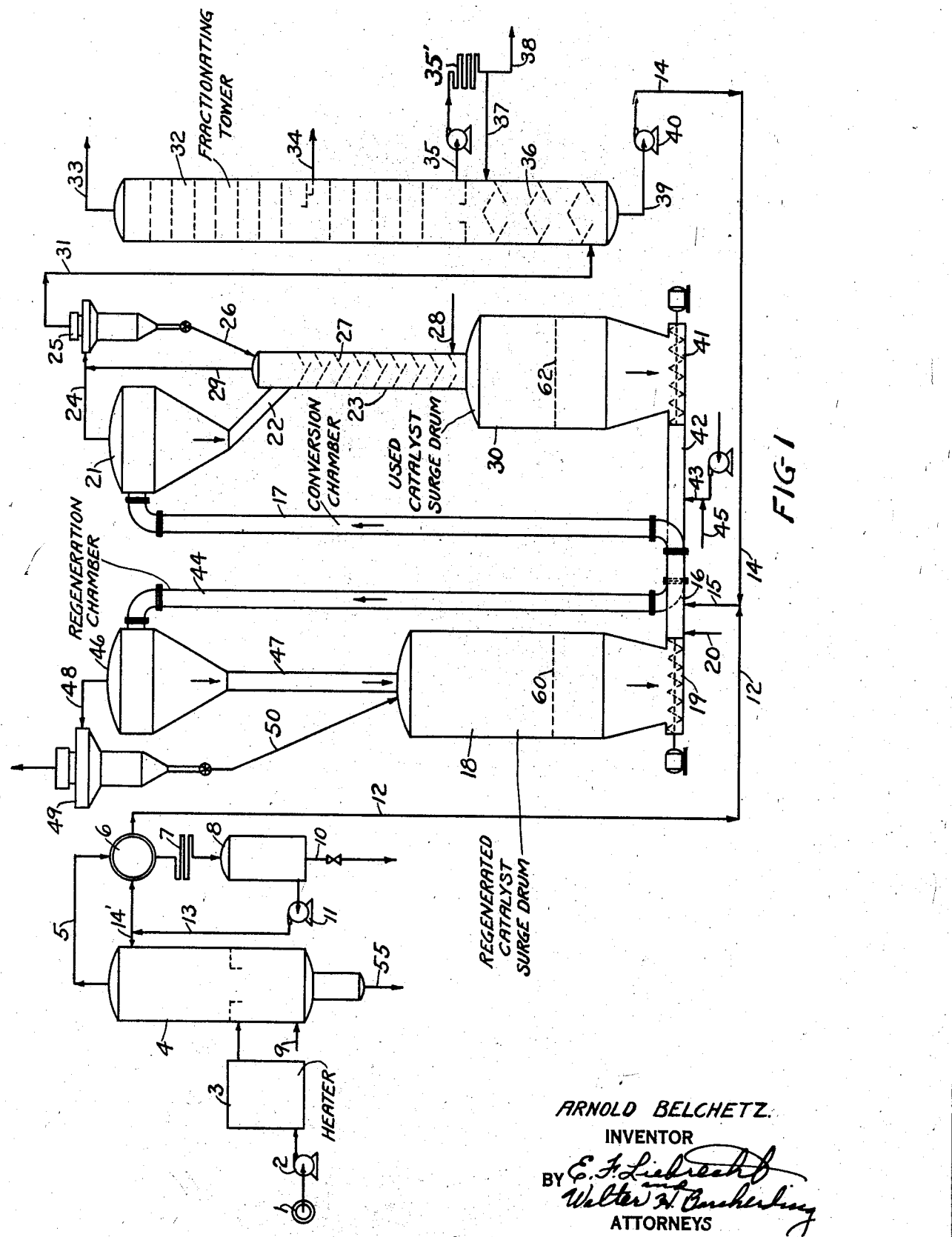

Patented Apr. 17, 1945

2,374,073

UNITED STATES PATENT OFFICE 2,374,073

CATALYTIC CONVERSION OF HYDROCARBONS

Arnold Belchetz, Kew Gardens, N. Y., assignor to The M. W. Kellogg Company, Jersey City, N. J., a corporation of Delaware Original application May 20, 1939, Serial No. 274,670. Divided and this application March 31, 1941, Serial No. 386,132

8 Claims. (Cl. 196—52)

The present application is a divisional application of my copending application Serial No. 274,670, filed May 20, 1939, now U. S. Patent 2,253,486. In said original application, Serial No. 274,670, a process is disclosed for the conversion of hydrocarbons involving a continuous cyclic operation, wherein a finely divided catalytic material is mixed with a stream of the vapors of the hydrocarbons undergoing treatment, and the mixture passed continuously through a conversion zone maintained under suitable conditions to effect the desired conversion. The spent catalytic material is separated from the vaporous conversion products and regenerated for reuse in the conversion operation by combustion of the deactivating substances such as carbonaceous material deposited thereon during the conversion operation. Regeneration is then effected by mixing the spent catalytic material with an oxygen-containing gas and passing the mixture through a regeneration zone maintained under suitable conditions to effect the desired combustion without subjecting the catalyst to excessive temperatures which would unduly impair its catalytic activity.

One of the features disclosed and claimed in said application involves the maintenance of the quantity of catalyst charged to the regeneration zone and/or the conversion zone in a predetermined relationship to the oil charged to the conversion zone whereby certain highly desirable advantages are obtained in both the conversion and regeneration stages.

A further feature disclosed in said application and to which the present application is particularly directed resides in the procedure whereby the used catalyst is separated and recovered from the effluent conversion products from the catalytic conversion zone.

The efficient recovery of the used catalyst from the effluent conversion products is one of the most serious problems arising in connection with the above described type of catalytic conversion operation, since this operation involves the circulation of a relatively large quantity of powdered catalyst in proportion to the oil undergoing treatment and is consequently economically feasible only when attended by highly efficient recovery of the catalyst. The primary object of the present invention is the provision of a highly effective catalyst recovery method for this purpose.

In accordance with the present invention, the vaporous conversion products containing used catalyst are passed from the conversion zone to a gas-solid separating zone, or, preferably, a series of such zones, wherein all but a relatively small quantity of the catalyst is separated from the vapors, the vapors being maintained during the separation above the temperature at which substantial condensation can occur. The vaporous conversion products containing the small residual quantity of catalyst are then passed to a cooling zone wherein a small fraction of the highest high boiling constituents is condensed and in which heavy fraction the residual catalyst is concentrated by absorption or entrainment. The cooling and condensation step is preferably effected by passing the mixture of vapors and residual catalyst through the bottom part of a fractionating zone provided with baffles over which a cooled recycle stream of the high boiling condensate is circulated and through which the vaporous mixture is passed to effect the desired separation of the catalyst by absorption or entrainment in the condensed heavy fraction.

The appended drawing is a diagrammatic illustration of a suitable form of apparatus for the practice of a preferred embodiment of the invention wherein preheated catalyst is utilized to vaporize the feed stock.

Referring to the drawing, feed to the system, for example, a reduced petroleum crude, enters from any convenient source indicated by the numeral 1 and pumped by pump 2 to a heater or furnace 3 wherein it is preheated to a suitable temperature then flash evaporated in evaporator 4.

The volatile portion of the crude is taken overhead from evaporator 4 as a gas oil fraction through line 5, and a heavy residual fraction is withdrawn at the bottom through line 55. From line 5 the gas oil vapors pass through a heat exchanger 6, then through a condenser coil 7 into accumulator 8. Steam introduced through line 9, is condensed together with the gas oil and separated therefrom in accumulator 8 through line 10. The gas oil condensate is pumped by pump 11 through line 13 to heat exchanger 6 and into line 12. Part of the gas oil is returned as reflux to the evaporator through line 14'.

The apparatus described above is merely illustrative and exemplary of conventional apparatus for supplying the gas oil or other treated hydrocarbon at a suitable temperature for the following conversion operation.

The preheated fresh feed in transfer line 12 may be advantageously combined with a hot recycle oil containing catalyst introduced through line 14 and produced in a later stage of the process pursuant to this invention as hereinafter described. The combined feed passes through line 15 into pipe 16 constituting an extension of the conversion reactor 17. Hot preheated catalyst is supplied from a collecting or surge drum 18 by suitable means such as a helical feeder 19 and mixed with the oil in pipe 16, the upper surface of the body of catalyst in drum 18 being indicated by dotted line 60. The quantity and temperature of the catalyst thus introduced preferably are sufficient to cause vaporization of the liquid oil feed thereby forming a suspension of the catalyst in the vapors. Sufficient steam or other suitable gas to initially disperse the catalyst as discharged from feeder 19 is preferably introduced through line 20. Steam or other suitable gas may be supplied in greater quantities through line 20 when required to facilitate the vaporization of the combined oil charge and to supplement the vapors resulting from the vaporization of the feed stock and recycle oil to produce the required volume of gas to carry the catalyst through the conversion reactor 17. The dimension of reactor 17 may be varied and is such as to assure the desired conversion dependent upon variable conditions used such as the feed stock, catalyst and quantities thereof employed. Operating conditions in the conversion zone such as the ratio by weight of the catalyst to fresh feed stock may be and preferably are maintained as set forth in said copending application, Serial No. 274,670, now U. S. Patent 2,253,486, that is, with catalyst-to-oil feed weight ratios greater than 2.5 to 1, and preferably greater than 5.0 to 1. The gaseous mixture of feed stock, catalyst and steam, flows upwardly through reactor 17 during which flow conversion or cracking of the oil to the desired extent occurs.

Reaction products pass from the top of reactor 17 to a separation system provided pursuant to the present invention which is especially effective for the recovery of catalyst from the vaporous reaction products.

As shown, this comprises a settling tank 21 in which the major proportion of the suspended catalyst is separated, the separated catalyst flowing by gravity from the bottom of tank 21 through conduit 22 to the top of a steam stripping tower 23 and the vapors containing a relatively small fraction of fine catalytic material are withdrawn at the top through line 24. These vapors pass through line 24 to a suitable separator such as a cyclone type of dust collector 25 wherein most of the remaining suspended catalyst is separated and then passed to tower 23 by gravity flow from the bottom of the separator through line 26.

Stripping tower 23 is utilized to displace hydrocarbon vapors contained in the voids between the particles of catalyst and is suitably provided with baffles 27 to effectively expose the catalyst passing downwardly therethrough to the stripping or displacing action of a countercurrently flowing current of steam introduced at the base of the tower through line 28. Steam containing the oil vapors displaced from the catalyst is withdrawn from the top of the tower through line 29 and combined with the vapor stream from tank 21. Used catalyst falls from the bottom of tower 23 into a surge drum 30.

The gas-solid separation zones constituted by settler 21 and cyclone 25 are maintained at a temperature above the condensation temperature of the vapors and serve to separate all but a small fraction of the total suspended solids, this unseparated fraction being normally less than 1% of the total and preferably of the order of 0.3% or less. The loss of this small percentage, however, would constitute a serious economical obstacle due to the exceedingly high quantities of catalyst circulated in catalytic systems of this type. In addition the consequent contamination of the liquid products by its presence therein would be highly undesirable.

Pursuant to this invention, the vaporous conversion products containing the small amount of residual catalyst are passed through line 31 to a cooling or partial condensation zone, suitably constituted by the lower section of a fractionating tower 32. Fractionating tower 32 may be a bubble tower of conventional design adapted to separate the vaporous conversion products into liquid fractions of desired boiling ranges, for example a low boiling fraction consisting of hydrocarbons within the gasoline boiling range may be withdrawn overhead through line 33, a light gas oil fraction through the side draw-off line 34, and a heavy gas oil fraction through side draw-off line 35. Condensate from vapors withdrawn through line 33 may be returned to the top of the tower as reflux in the conventional manner.

The lower section of tower 32 is preferably provided with baffles 36 or other suitable means for promoting gas-liquid contact. A portion of the heavy gas oil cut withdrawn through line 35 is cooled in cooling coil 35' and returned to the cooling section in the lower part of tower 32 through line 37 and passes downwardly over the baffles 36 in countercurrent flow to the vapors introduced through line 31. The incoming vapors are thereby cooled sufficiently to condense a small fraction of the highest boiling constituents, for example about 10% and preferably of the order of about 5% or less of the total incoming vapors. The residual catalyst is entrained and concentrated in the high boiling fraction thus produced and withdrawn through line 39. This fraction is then preferably subjected to further treatment in a catalytic conversion zone with additional quantities of feed. It may for example be suitably recycled to the same conversion zone in which it was initially produced by pump 40 and line 14 as previously described.

In the regeneration flow, used catalyst is fed from drum 30 (in which the upper surface of the catalyst mass is indicated by dotted line 62) by suitable means such as screw feeder 41 to pipe 42 and is carried therein by a current of oxygen-containing gas such as air injected through line 43 to regeneration or combustion chamber 44 in which combustion of the carbonaceous deposit on the spent catalyst occurs during the passage of the catalyst therethrough. Steam may be introduced to line 42 if desired through line 45.

Combustion gases bearing the regenerated catalyst pass from chamber 44 into a suitable recovery system for separating the catalyst. As shown, this system comprises a settling tank 46 wherein most of the catalyst is separated and flows downwardly therefrom through conduit 47 to surge drum 18. The separated gases containing a small residual amount of catalyst fines leave separator 46 at the top through line 48 and pass to a cyclone type of dust collector 49, wherein substantially complete separation of the catalyst is effected. The separated catalyst from collector 49 then flows downwardly through line 50 and is combined with the initially separated catalyst in drum 18 from which it is fed directly to the conversion stage by feeder 19, as previously described. Drum 18 and feeder 19 may be suitably provided with heat insulation material to obviate loss of heat by the regenerated catalyst in its passage therethrough.

It is to be understood that the embodiment of the invention described in the foregoing is illustrative only, and that the essential features of the invention are capable of use in a wide variety of modified process flows. All such modifications are intended to be included within the scope of the appended claims.

I claim:

1. In a continuous process for the catalytic cracking of high boiling hydrocarbons to low boiling hydrocarbons within the gasoline boiling range wherein the catalyst is contacted in a finely divided or powdered condition with vapors of the hydrocarbons undergoing treatment at a pressure and elevated temperature suitable for the cracking reaction and wherein regenerated catalyst is continually added to the cracking zone at a rate adapted to maintain the catalyst-to-oil feed weight ratio greater than 2.5 to 1, the improved method of recovering the finely divided catalyst from the vaporous conversion products which comprises separating over 99% of the added catalyst from said vaporous conversion products without substantial condensation of the vapors, passing the vapors containing the residual catalyst through a cooling zone maintained under suitable conditions to cool and condense a small fraction consisting of the highest boiling constituents of the conversion products amounting to less than 10% by weight thereof thereby separating the residual used catalyst in mixture with said condensate, and recycling the mixture of condensate and used catalyst to the catalytic conversion zone with additional quantities of the said high boiling hydrocarbons undergoing conversion and a relatively large quantity of fresh catalyst.

2. In a continuous process for the catalytic cracking of high boiling hydrocarbons to low boiling hydrocarbons within the gasoline boiling range wherein the catalyst is contacted in a finely divided or powdered condition with vapors of the hydrocarbons undergoing treatment at a pressure and elevated temperature suitable for the cracking reaction and wherein regenerated catalyst is continually added to the cracking zone at a rate adapted to maintain the catalyst-to-oil feed weight ratio greater than 2.5 to 1, the improved method of recovering the finely divided catalyst from the vaporous conversion products which comprises passing the vaporous conversion products through gas-solid separating zones under suitable conditions to separate over 99% of the added catalyst without substantial condensation of the vapors, passing the vapors containing the residual catalyst through a cooling zone maintained under suitable conditions to cool and condense a small fraction consisting of the highest boiling constituents of the conversion products amounting to less than 10% by weight thereof thereby separating the residual used catalyst in mixture with said condensate, and recycling the mixture of condensate and used catalyst to a catalytic conversion zone with an additional quantity of said high boiling hydrocarbons and a relatively large quantity of fresh catalyst.

3. In a continuous process for the catalytic cracking of high boiling hydrocarbons to low boiling hydrocarbons within the gasoline boiling range wherein the catalyst is contacted in a finely divided or powdered condition with vapors of the hydrocarbons undergoing treatment at a pressure and elevated temperature suitable for the cracking reaction and wherein regenerated catalyst is continually added to the cracking zone at a rate adapted to maintain the catalyst-to-oil feed weight ratio greater than 2.5 to 1, the improved method of recovering the finely divided catalyst from the vaporous conversion products which comprises separating over 99% of the added catalyst from said vaporous conversion products without substantial condensation of the vapors, introducing said vapors containing the residual catalyst into the lowest section of a fractionating tower and cooling the vapors in said section to condense a small fraction consisting of the highest boiling constituents of the conversion products amounting to less than 10% by weight thereof and separating the residual used catalyst in mixture with said condensate, and recycling the mixture of condensate and used catalyst to a catalytic conversion zone with an additional quantity of said high boiling hydrocarbons and a relatively large quantity of fresh catalyst.

4. In a process for the catalytic conversion of high boiling hydrocarbons to low boiling hydrocarbons within the gasoline boiling range wherein the catalyst is contacted in a finely divided or powdered condition with vapors of the hydrocarbons undergoing treatment, the improved method of recovering the finely divided catalyst from the vaporous conversion products which comprises passing the vaporous conversion products through a gas-solid separating zone under suitable conditions to separate not less than about 99% of the catalyst contained therein without substantial condensation of the vapors, passing the vapors containing the residual catalyst to a cooling zone maintained under suitable conditions to condense a small fraction consisting of the highest boiling constituents of the vaporous conversion products and constituting an amount less than about 10% by weight of said products whereby the residual used catalyst is separated in mixture with said condensate, and returning the mixture of condensate and used catalyst to a catalytic conversion zone with an additional quantity of said high boiling hydrocarbons and a relatively large quantity of fresh catalyst.

5. A process as defined in claim 4 wherein said small fraction constitutes an amount less than about 5% by weight of the vaporous conversion products.

6. In a continuous process for the catalytic cracking of high boiling hydrocarbons to low boiling hydrocarbons within the gasoline boiling range wherein the catalyst is contacted in a finely divided powdered condition with vapors of the hydrocarbons undergoing treatment at a pressure and elevated temperature suitable for the cracking reaction and wherein regenerated catalyst is continually added to the cracking zone at a rate adapted to maintain the catalyst-to-oil feed weight ratio greater than 5. to 1, the improved method of recovering the finely divided catalyst from the vaporous conversion products which comprises separating over 99% of the added catalyst from said vaporous conversion products without substantial condensation of the vapors, passing the vapors containing the residual catalyst through a cooling zone maintained under suitable conditions to cool and condense a small fraction consisting of the highest boiling constituents of the conversion products amounting to less than 10% by weight thereof thereby separating the residual used catalyst in mixture with said condensate, and continuously recycling a thus produced mixture of said highest boiling constituents of the conversion products and used catalyst to the catalytic conversion zone with additional quantities of the said high boiling hydrocarbons undergoing conversion and a relatively large quantity of regenerated catalyst sufficient to maintain the catalyst-to-oil feed weight ratio greater than 5. to 1.

7. A process as defined in claim 6 wherein a condensate of the higher boiling normally liquid components of said vaporous conversion products is cooled below its condensation temperature by passage through an indirect heat-exchange cooling zone, and the thus produced cool condensate is injected into said first-mentioned cooling zone into contact with the vapors containing the residual catalyst.

8. In a continuous process for the catalytic cracking of high boiling hydrocarbons to low boiling hydrocarbons within the gasoline boiling range wherein the catalyst is contacted in a finely divided powdered condition with vapors of the hydrocarbons undergoing treatment at a pressure and elevated temperature suitable for the cracking reaction and wherein regenerated catalyst is continually added to the cracking zone at a rate adapted to maintain the catalyst-to-oil feed weight ratio greater than 5. to 1, the improved method of recovering the finely divided catalyst from the vaporous conversion products which comprises separating all but a small percentage of the added catalyst from said vaporous conversion products without substantial condensation of the vapors, passing the vapors containing the residual catalyst through a cooling zone maintained under suitable conditions to cool and condense a small fraction consisting of the highest boiling constituents of the conversion products amounting to less than 10% by weight thereof thereby separating the residual used catalyst in mixture with said condensate, cooling a condensate of the higher boiling normally liquid components of said vaporous conversion products to a temperature below its condensation temperature by passage through an indirect heat-exchange cooling zone, and injecting the thus produced cooled condensate into said first-mentioned cooling zone and contacting the vaporous conversion products therewith, continuously recycling a thus produced mixture of said highest boiling constituents of the conversion products and used catalyst to the catalytic conversion zone with additional quantities of the said high boiling hydrocarbons undergoing conversion and a relatively large quantity of regenerated catalyst sufficient to maintain the catalyst-to-oil feed weight ratio greater than 5. to 1.

ARNOLD BELCHETZ.